US008073917B2

(12) United States Patent
Golub

(10) Patent No.: US 8,073,917 B2
(45) Date of Patent: *Dec. 6, 2011

(54) SYSTEM FOR DETERMINING EMAIL SPAM BY DELIVERY PATH

(75) Inventor: Seth Golub, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/538,082

(22) Filed: Aug. 7, 2009

(65) Prior Publication Data

US 2009/0300129 A1    Dec. 3, 2009

Related U.S. Application Data

(63) Continuation of application No. 10/883,335, filed on Jun. 30, 2004, now Pat. No. 7,580,981.

(51) Int. Cl.
*G06F 15/16* (2006.01)
*G06F 15/173* (2006.01)

(52) U.S. Cl. ........ 709/206; 709/224; 709/225; 709/232; 709/239

(58) Field of Classification Search .................. 709/206, 709/224, 225, 239; 713/151, 170, 176
See application file for complete search history.

(56) References Cited

U.S. PATENT DOCUMENTS

| | | | |
|---|---|---|---|
| 6,779,021 B1 | 8/2004 | Bates et al. ................. 709/206 |
| 6,802,012 B1 | 10/2004 | Smithson et al. ............. 713/200 |
| 6,941,348 B2 | 9/2005 | Petry et al. .................. 709/224 |
| 6,957,259 B1 | 10/2005 | Malik .......................... 709/225 |
| 6,978,248 B1 | 12/2005 | Walker et al. ................ 705/10 |
| 7,155,484 B2 | 12/2006 | Malik .......................... 709/206 |
| 7,155,608 B1 * | 12/2006 | Malik et al. .................. 713/170 |
| 7,228,280 B1 | 6/2007 | Scherf et al. ................. 704/500 |
| 7,272,853 B2 | 9/2007 | Goodman et al. ............. 726/13 |
| 7,409,203 B2 * | 8/2008 | Zabawskyj et al. ......... 455/412.1 |
| 2002/0156763 A1 | 10/2002 | Marchisio ...................... 707/1 |
| 2002/0174316 A1 | 11/2002 | Dale et al. ..................... 711/170 |
| 2002/0199095 A1 * | 12/2002 | Bandini et al. ............... 713/151 |
| 2003/0055668 A1 | 3/2003 | Saran et al. .................... 705/1 |
| 2003/0088634 A1 | 5/2003 | Friedman ..................... 709/207 |
| 2004/0093384 A1 | 5/2004 | Shipp .......................... 709/206 |
| 2004/0111475 A1 | 6/2004 | Schultz ........................ 709/206 |
| 2004/0186898 A1 | 9/2004 | Kimura et al. ............... 709/213 |
| 2004/0221062 A1 * | 11/2004 | Starbuck et al. ............. 709/246 |
| 2004/0260776 A1 | 12/2004 | Starbuck et al. ............. 709/206 |
| 2004/0266413 A1 | 12/2004 | Bronstein .................... 455/415 |
| 2004/0267886 A1 | 12/2004 | Malik .......................... 709/200 |
| 2005/0015432 A1 | 1/2005 | Cohen .......................... 709/201 |
| 2005/0022008 A1 | 1/2005 | Goodman et al. ............ 713/201 |
| 2005/0033845 A1 | 2/2005 | Perepa et al. ................ 709/226 |
| 2005/0076084 A1 | 4/2005 | Loughmiller et al. ........ 709/206 |
| 2005/0076220 A1 * | 4/2005 | Zhang et al. ................. 713/176 |
| 2005/0091319 A1 | 4/2005 | Kirsch .......................... 709/206 |
| 2005/0091320 A1 | 4/2005 | Kirsch et al. ................. 709/206 |
| 2005/0101306 A1 * | 5/2005 | Zabawskyj et al. ......... 455/414.1 |

* cited by examiner

*Primary Examiner* — Quang N. Nguyen
(74) *Attorney, Agent, or Firm* — Morgan, Lewis & Bockius LLP

(57) ABSTRACT

A spam detector for determining likelihood of forgery of a source in an email addressed to a destination is provided, comprising extraction means for extracting delivery path information from one or more packets in the packet flow of the email, and comparison means for comparing the extracted delivery path information with trusted delivery path information from the source to the destination.

16 Claims, 3 Drawing Sheets

Whitelist for User A

| User Name | Delivery Path |
|---|---|
| 1. Jerry Sloane | a c l m n q p<br>a c l z y q p |
| 2. Patti Cake | b l c q v r l<br>b v c q r l |
| 3. Martin Boyles | z m n c d f r |
| 4. | |
| ... | |

*Fig. 2*

SYSTEM FOR DETERMINING EMAIL SPAM BY DELIVERY PATH

RELATED APPLICATIONS

This application is a continuation of U.S. patent application Ser. No. 10/883,335, filed Jun. 30, 2004, now U.S. Pat. No. 7,580,981, issued Aug. 25, 2008, which application is incorporated by reference herein in its entirety.

FIELD OF THE INVENTION

The present invention is in the field of communication services, and applies more particularly to methods and apparatus for determining probability of Spam for Email messages.

BACKGROUND OF THE INVENTION

In the art of checking email for Spam messages, one standard tool that is commonly used is a compiled data list defining user-approved contact email addresses, which is a list commonly known in the art as a whitelist. A whitelist is a list of user contacts typically taken from a user's email address book and used to validate incoming email by comparing the sender (From:) address of the email to the addresses in the list. For example, if an email arrives for the user and the From: address is found in the user's whitelist of trusted contacts, then that particular email is typically allowed through to the user's inbox. If the sender's address is not in the whitelist then some other process may have to be used to make a determination of possible spam.

One drawback to current whitelisting techniques for Spam detection is that Spammers may forge From: addresses to work around white lists. Typically those (spammers) who email large quantities of Spam don't use their actual address as a return address, because their actual addresses may already be suspect.

Given an Email with a From: address, packets in the flow for the email will largely have arrived at the destination by the same path, which path is recorded in headers of the packets, as is well-known in the art. Packets may, in a straightforward process, be checked for delivery path, and delivery data may be extracted and recorded in a variety of ways.

Therefore, what is clearly needed in the art is a method and apparatus for monitoring delivery paths for emails, and using extracted data to provide trust characteristics for paths relative to source data such as From: addresses.

SUMMARY OF THE INVENTION

In an embodiment of the invention a spam detector for determining likelihood of forgery of a source in an email addressed to a destination is provided, comprising extraction means for extracting delivery path information from one or more packets in the packet flow of the email, and comparison means for comparing the extracted delivery path information with trusted delivery path information from the source to the destination.

In one embodiment the spam detector further may comprise means for developing trusted delivery path information from sources to destinations. Also in an embodiment the means for developing may include means for sending test messages and recording delivery path information for the test messages. The means for developing may also include means for storing whitelist information for individual users and for associating trusted delivery path information with individual contacts in a whitelist.

In other embodiments there may be means for intercepting and testing emails for individual users at a network site, and the means for testing may include testing an email destined for a particular user by comparing a destination for the email against a whitelist associated with that user, and also comparing delivery path information extracted from the email against trusted delivery path information for that user's destination from a purported source of the email.

In some embodiments the network site may be an Internet Service Provider (ISP). Further, the detector may include means for intercepting and testing emails for individual users associated with an enterprise at a server connected on a local area network at the enterprise site. Testing may also be done at a user's Internet-connected computer appliance.

In another aspect of the invention a method for verifying a whitelist test for an email is provided, comprising (a) extracting delivery path information from a packet in the packet flow of a candidate email; and (b) comparing the extracted delivery path information with trusted delivery path information from the source to the destination. The method may further comprise developing trusted delivery path information from sources to destinations, or sending test messages and recording delivery path information for the test messages. In some embodiments the developing may include storing whitelist information for individual users and for associating trusted delivery path information with individual contacts in a whitelist.

In some embodiments the method may include intercepting and testing emails for individual users at a network site, and in some embodiments the testing may include testing an email destined for a particular user by comparing a destination for the email against a whitelist associated with that user, and also comparing delivery path information extracted from the email against trusted delivery path information for that user's destination from a purported source of the email. The network site may be at an Internet Service Provider (ISP).

In some embodiments the method may include intercepting and testing emails for individual users associated with an enterprise at a server connected on a local area network at the enterprise site, and in some embodiments the method may include testing emails at a user's Internet-connected computer appliance.

In yet another aspect of the invention a machine-readable medium having stored thereon a set of instructions that cause a machine to perform a method is provided, comprising (a) extracting delivery path information from a packet in the packet flow of a candidate email; and (b) comparing the extracted delivery path information with trusted delivery path information from the source to the destination.

In some embodiments the method may further comprise developing trusted delivery path information from sources to destinations, and the developing may include sending test messages and recording delivery path information for the test messages. The developing may also include storing whitelist information for individual users and for associating trusted delivery path information with individual contacts in a whitelist.

In some embodiments the method may include intercepting and testing emails for individual users at a network site, and the testing may include testing an email destined for a particular user by comparing a destination for the email against a whitelist associated with that user, and also comparing delivery path information extracted from the email against trusted delivery path information for that user's destination from a purported source of the email. The network site may be an Internet Service Provider (ISP).

In some embodiments the method may include intercepting and testing emails for individual users associated with an enterprise at a server connected on a local area network at the enterprise site, and testing may also be done at a user's Internet-connected computer appliance.

BRIEF DESCRIPTION OF THE DRAWING FIGURES

FIG. 2 is a table showing an association of whitelist contacts with delivery path information.

DESCRIPTION OF EMBODIMENTS OF THE INVENTION

Figure 1:
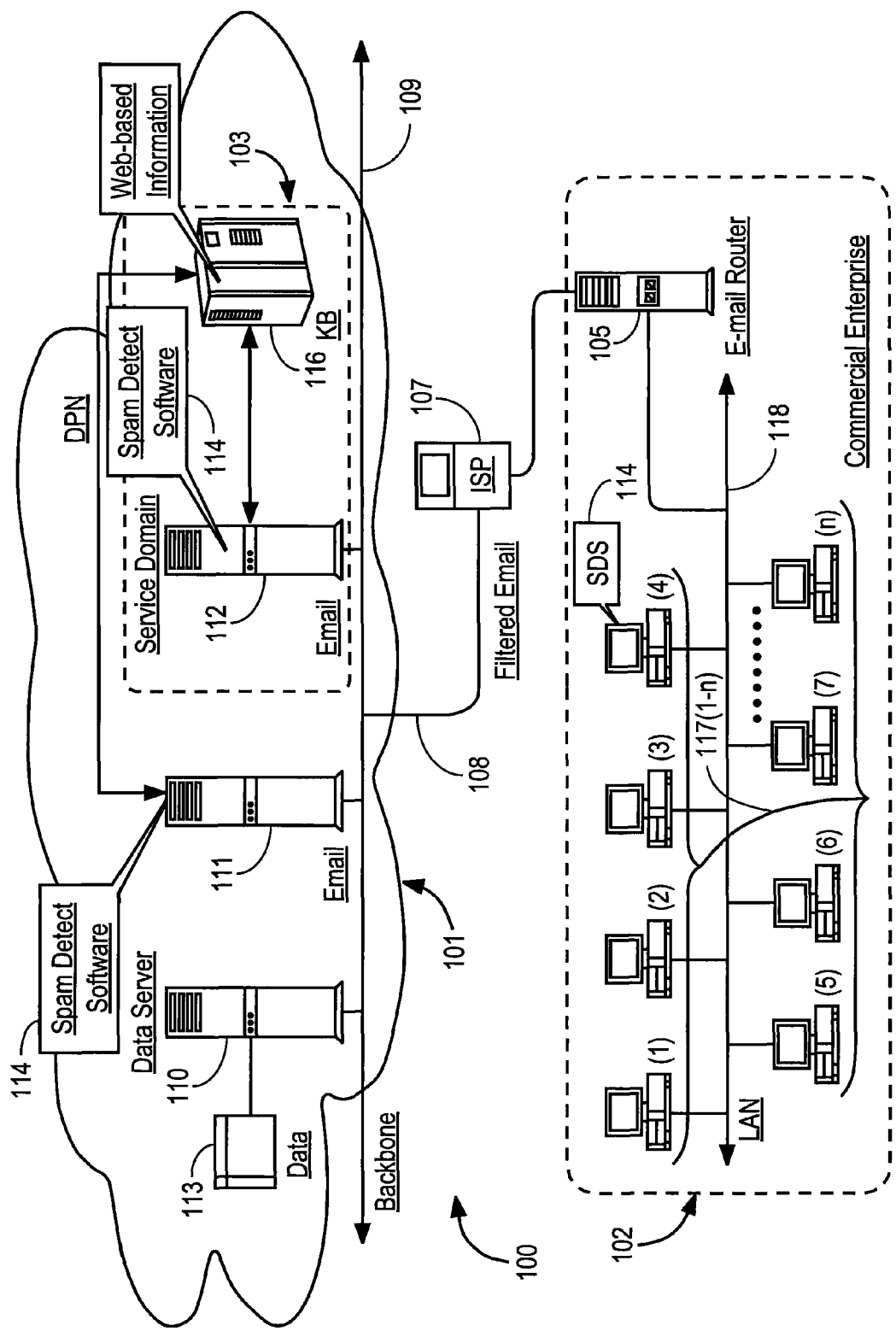
FIG. 1 is a diagram illustrating an architecture for practicing an embodiment of the present invention.

FIG. 1 is an architectural overview of a communications network 100 adapted for filtering email messages for Spam characteristics according to an embodiment of the present invention. Communications network 100 encompasses a data-packet-network (DPN) 101 and, for purposes of illustration, a connected commercial enterprise 102. Enterprise 102 can be any type of commercial business, like a call-in center, a sales organization, or any other type of business having multiple agents that send and receive email using network 101 as a transport medium. In some embodiments of the invention, however, the system may serve a single recipient, such as an individual user connecting to the Internet through an Internet Service Provider (ISP) of some description.

Network 101 is in one embodiment of the invention a wide-area-network (WAN) like the well-known Internet network, including the World Wide Web (WWW). The Internet network serves as a good example because of the wide public access characteristics of the Internet and because of supporting protocols like transfer control protocol/Internet protocol (TCP/IP) and other Internet protocols supporting email transport. The Internet is the largest known conveyance of emails.

In some other embodiments of the invention network 101 may be a corporate Intranet, an Ethernet network or any other sub-network that is enabled for electronic mail transport protocols like Post Office Protocol (POP), Simple Message Transport Protocol (SMTP), and/or Internet Mail Access Protocol (IMAP), all of which are well known in the art, or any other messaging protocol.

DPN 101 is referred to hereinafter as Internet network 101 in accordance with certain embodiments, but this usage should not be considered to limit the spirit and scope of the invention.

Internet 101 in this example has a backbone 109 extending throughout, which represents the myriad equipment, lines and access points comprising the Internet as a whole. Therefore there are no geographic limits to the practice of the present invention. Within the extent of Internet 101 there is illustrated a service domain 103. Service domain 103 represents any enterprise that is adapted to host any of the methods and apparatus of the present invention thus providing services according to an embodiment of the invention to a client, such as to enterprise 102.

An email server system 112 is illustrated within service domain 103 and is connected to backbone 109 for communication. Email server 112 is enabled as a server for storing and forwarding electronic messages such as email. In this example server 112 is hosted and maintained by service domain 103 and provides email services to clients of the hosting enterprise. Server 112 in this embodiment has an instance of spam detection logic 114 according to an embodiment of the present invention adapted to monitor messages being forwarded through server 112 for characteristics that may be associated with spam. Logic 114 may be implemented in some embodiments as software, but in others may be by hardware or firmware, or by a combination of software, hardware or firmware.

A data repository 116 is provided within service domain 103 and is connected to backbone 109 for communication and directly connected to server 112 using a high-speed data connection (double arrow). Repository 116 in this example is a knowledge base (KB) and stores and maintains information about subscribers, emails received and sent, and email characteristics, as well as, in some instances at least, determination as to whether emails monitored may be spam. Repository 116 is referred to below as KB 116.

Some of the knowledge stored in KB 116 may be Web-based in the sense that it can be accessed from Web-sources and then stored in KB 116 for quick reference. KB 116 is enabled to store information about emails such as data paths, postal parameters, telephone numbers, and universal resource locators (URLs) that may be associated with one or more email messages processed by server 112. The information includes data sets that might be directly related to an email contact parameter and sub-sets of data that may be indirectly related to an email contact parameter.

In some embodiments host 103 may also have data collection capabilities using such as search and data collection technologies. The described functionality in at least an indirect way (process association) may be integrated with spam detection logic 114 to enhance the functionality and performance of the software.

An email server 111 is illustrated in this example within Internet network 101 and connected to backbone 109 at a point outside of service domain 103. Server 111 may be a third-party email server not directly hosted by service domain 103. However, email server 111 is enhanced in this example with an instance of spam detection logic 114 for the purpose of detecting spam using at least some of the same methods used by hosted server 112. In this way services of the present invention may be extended to third-party enterprises under a contractual arrangement. Server 111 is illustrated as connected to KB 116 within service domain 103 by way of a high speed data link and therefore has equivalent capability to hosted server 112. Server 111 also has network access via backbone 109 to server 112 and if authorized to KB 116.

It will be apparent to one with skill in the art of email services that the standard email service description of server 111 does not have to be identical to that of server 112 in order to practice an embodiment of the present invention. For example, server 112 may be adapted for IMAP while server 111 may not. Additionally any enterprise that might be hosting server 111 may have different email services and features than the services provided by the server in service domain 103. Any instance of spam detection logic provided to server 111 may also be somewhat altered for service compatibility without departing from the spirit and scope of the present invention.

It will be apparent to one with skill in the art that the services provided by logic 114 may be distributed to a plurality of different third-party servers to enhance the spam detection capabilities of those servers without departing from the spirit and scope of the present invention. Similarly, the enterprise that is hosting server 112 may also host a plurality of additional servers within the physical boundaries of the enterprise or distributed over backbone 109 at different geographic network locations without departing from the spirit and scope of the invention. The inventor illustrates just one hosted server and one third-party server as sufficient for adequate description of embodiments of the invention.

A data server 110 is illustrated in this example within Internet 101 and is connected to backbone 109 for communication at a point outside the physical domain of service domain 103. Server 110 may be enabled to return data to any authorized connecting machines upon request. Information returned by server 110 in response to a request from a machine may include HTML embedded information or information transported according to a machine readable protocol like extensible markup language XML, for example. Data server 110 may therefore be any type of third party information server, such as a Geographic Information System (GIS), a Credit Information System (CIS), a Customer Relations Management (CRM) system or any other public or private information system subject to public access or authorized private access.

Server 110 in this example has a data store 113 connected by a high-speed data link. Data store 113 may be enabled to store and maintain any type of information appropriate to the particular server description. For example, if the system is a GIS then the data in store 113 might relate to geographic location and mapping data related to defined entities like businesses, landmarks, rivers, parks, or other entities that have physical locations that can be mapped. A system such as this might also provide additional summary information about a physical location or region defined by some boundary (if GIS) like populace information, products of region, rainfall amounts, and so on. It will be recognized by one with skill in the art of information systems that there are a wide variety of such accessible systems available in the Internet network, which can be searched using a variety of manual and/or automated methods.

Enterprise 102 in this example may be a client of service domain 103 and therefore subscribe to email services available through server 112, including spam monitoring or detection services also provided. Enterprise 102 may have a Local-Area-Network (LAN) 118 adapted for Internet network protocols to enable network communication with clients using network 101 as a transport. In this example, LAN 118 provides Internet connectivity to a plurality of workstations illustrated herein as workstations 117 (1-n). It is assumed in this example that each workstation 117 (1-n) is at least adapted for email communication by way of an email client application (not illustrated).

It is emphasized again at this point that the plurality of workstations interconnected by LAN 118 as a client is a convenience for description, and that services and functions according to embodiments of the invention may be provided by a similar system to individual users connected to the Internet network in any convenient manner. Further, in some embodiments of the invention logic 114 may be provided to and execute on computer appliances of individual users. To this end an instance of Spam Detect Software (SDS) 114 is shown as executing on an individual station (4) in enterprise 102, and the skilled artisan will understand that the SDS may also be resident and executing on individual other stations in the enterprise, or on an individual user's station connected to the Internet as well. Further, the skilled artisan will understand that logic 114 may be server-based, that is, provided to LAN-connected stations at need by a server on the LAN, or it may be logic resident on individual ones of the workstations.

An email routing system 105 is illustrated in FIG. 1 within enterprise 102 and may be enabled as a central routing point for all incoming and outgoing email messages comprising email communication between those workstations 117 (1-n) and external points. In the case of an individual user connected to the Internet these functions might be performed by an email client executing on the user's computer appliance, such as a PC.

Router 105 in this example of an enterprise 102 having a plurality of workstations 117 sorts incoming email and forwards email to appropriate recipients over LAN 118. Outgoing email from LAN-connected workstations is forwarded to email server 112. Router 105 is not required in order to practice some embodiments of the present invention. The use of router 105 is merely a convenience for enterprise 102 in that incoming emails may be addressed to, for example, sales@enterprise.com and then be sorted according to subject, content, and so on and distributed to recipients according to any routing strategy.

In another embodiment, each workstation has an email client and account and may interact directly with server 112, the accounts listed in server 112 on behalf of the subscriber stations. In one embodiment, the workstations 117 (1-n) can practice an embodiment of the present invention by accessing mail with a desktop client using POP3 or by accessing mail using a Web-based protocol like IMAP. A difference is that IMAP Web-based services enable access to email server 112 from other network-capable devices in a mobile environment. In both aspects, all spam detection and indication may occur within service domain 103, or in server 111 (third party application).

Logic 114 can be provided as a standalone spam filtering application that can be used in place of conventional spam filters, or it can be used in conjunction with conventional filtering processes to provide enhanced detection or evaluation capabilities.

There are many sorts of Spam filtering and detection systems, and as time goes by many more are being proposed, developed, tested, and in some cases patented. In many cases new ways of filtering and monitoring for Spam are developed as a direct result of techniques developed and used by Spammers to avoid current technology for defeating Spam.

Whitelists as a simple technique for checking From: addresses against a list of trusted contacts was described in a general way in the Background section above. It was further mentioned that Spammers may incorporate fraudulent From: addresses to disguise the true source of Spam, and using fraudulent From: addresses that may also be in user's whitelists is a preferable technique for defeating Spam detection systems that may rely solely on, or be primarily based upon whitelists.

FIG. 1 is a block diagram illustrating a whitelist filtering architecture according to an embodiment of the present invention. As was described in the background section of this specification, whitelist filtering, as it relates to email, typically involves testing incoming emails against a whitelist of trusted From: addresses. Depending on results of such a test, certain mails may be allowed to pass and certain others may be delayed or deleted rather than sent on to a recipient.

The architecture illustrated in FIG. 1 shows a whitelist for filtering email messages between a user station 117 and an email server 112 using a whitelist 104 (FIG. 2). User station 117 may be a computer system that accesses email server 112 by physically connecting to the server over the Internet network for example. Internet connectivity between user station 117 and server 112 is illustrated herein by a Internet backbone 109 with connection to email server ports from user station 117. Also typical is the use of an email client on user station 117 to access the user account on server 112 for email interaction. In some cases the email account of the user operating station 117 might be Web-based wherein the user does not require an email client application in order to interact.

In the prior art ports may include a Post Office Protocol (POP3) port, a Simple Message Transport Protocol (SMTP) port, and an Instant Message Access Protocol (IMAP) port. Port may allow access for retrieving and viewing email using a desktop client, for example. Port may allow outgoing email to be distributed to destinations outside of server 112, such as to other email servers hosted by other service providers. Port may allow clientless interaction from any network-capable machine and the user interface may be a Web page. Typically, an IMAP-enhanced server may allow access through many browser applications through an ISP account. Using IMAP also may enable users to access email services from a variety of network-capable appliances.

Email server 112, as is typical of prior-art servers, may include a message store and a send queue. Message store may typically be a text list containing separate account headings for each subscribing user, under which user messages being stored at the server may be listed. A user for the purpose of viewing and downloading email typically may access store. In a store and forward embodiment, store may be used to store all of a user's incoming email, generally listed sequentially under the user account header. Attachments that might be sent along with messages are in many cases tagged to the messages and stored separately for download.

Send queue is typically where messages are stored for send from server 112 to other server destinations. Any created outgoing mail may be deposited in queue and sent out to other server destinations or, in some cases, to message store if the intended recipient is a client of server 112. In this case one may assume a data connection between queue and store although none is illustrated.

A user operating station 117 may have a whitelist 104 associated with his or her email account with the host of server 112. Whitelist 104 typically contains identification of any contacts that the user trusts for email correspondence. In many cases a whitelist is compiled from a user's email address book associated with client. Whitelist 104 may be illustrated both at the location of station 117 and at the location of server 112 as part of user data pool 106. Data pool 106 typically may contain all of the user whitelist data for all of the subscribers of email server 112. Whitelist 104 may represent just one list attributed to a single user.

In a typical case whitelist 104 may be available to both station 117 and to server 112 so that a user may update whitelist 104 and then synchronize it with the list held at server 112. In typical operation, server 112 may process incoming email for the user operating station 117 and client against, hopefully, a current version of whitelist 104 accessed by the server from user data 106 at the time of email processing. Basically it may be a sorting operation wherein any emails that do not have a "from" email address that matches an email address found on whitelist 104 may be identified and tagged. Depending on the exact scheme, tagged messages may be labeled Spam and sorted at the time of viewing or downloaded into a junk mail folder or an equivalent set up on the user's client.

While some optimization may exist for automated updating or synchronization of the user's data, it may be largely the responsibility of the user to maintain an active and current whitelist 104. The user may have to add contacts that are trusted, delete contacts that are no longer used or trusted and so on. The task of whitelist maintenance may often become an onerous task for the user and the inflexibility of the system should be readily apparent to any one with skill in the art of whitelisting technologies.

FIG. 2 is a diagram illustrating a table associating contact names 120 in a whitelist 104 belonging to a particular user, in this case User A, with path data 124 indicating hops in a path from each contact name 120 to the user's destination address, in an embodiment of the present invention. Nodes 122 along a path 124 are simply indicated in this example as lower-case letters. The skilled artisan will recognize that node 122 designations in the art may be done in many ways, and abbreviated and related to simpler designations and identification indicia, as has been done here for simplicity in description. Each lower case letter in a path 124 therefore represents a server or a router in a network, such as the Internet, and may be identified in a more robust way by such as server name, domain, and by IP address(es) for example. Further, it should be apparent that there may be many more or fewer hops shown than those indicated.

The skilled artisan will recognize that a typical whitelist 104 for a user such as User A may have many more contact names 120 than the three shown in FIG. 2, perhaps even hundreds of names. The three shown with an indicator for a fourth are sufficient, however, to describe features of an embodiment of the invention. The skilled artisan will also recognize that the contact names 120, such a Jerry Sloane, are names representing typically email addresses, such as, for example, jsloane@earthlink.net, just as one might experience in using a typical email client.

The whitelist 104 associated with delivery path 124 as shown in FIG. 2 is a tool used in an embodiment of the present invention, and may be developed in this example in an empirical process. That is, such an association may be made by monitoring actual email transmissions to User A, for example, and capturing data path information 124 for emails sent to User A from each of the contact names 120 as sources. That is, for a predetermined period of time, a system according to an embodiment of the present invention, such as logic 114 shown in FIG. 1, may monitor traffic addressed to User A from one or more of the names in User A's whitelist 104, and extract delivery path data 124 for exemplary packets in email packet flow. Logic may be provided to canonocalize the information extracted, and to then use the canonocalized data to build an association table such as that shown in FIG. 2.

In an alternative embodiment, logic 114 may, upon being presented with a user's whitelist 104 and being appropriately configured and initialized, ping individual ones of the sources indicated by the contact names 120 and record data path information 124 on returns in the process. There are a number of ways this may be done in the art, resulting in associations as shown in FIG. 2. A process in which the source is known for sure to be correct, such as in a pinging process, may be preferable in developing an association like that shown in FIG. 2.

Further to the above, in some cases in FIG. 2 distinct but similar paths 124 are shown for individual contacts 120. This is because the delivery path 124 may, for any number of reasons, not be exactly the same each time a packet starts at the source and is delivered to the destination. Network topology, for example, may change over time. Certain nodes 122 may go down and others come up, and many other anomalies may intervene. Still, one may expect that, over a short term time period, the delivery path 124 from a source to a destination will be relatively stable, and may be recorded in a recognizable way.

Figure 3:
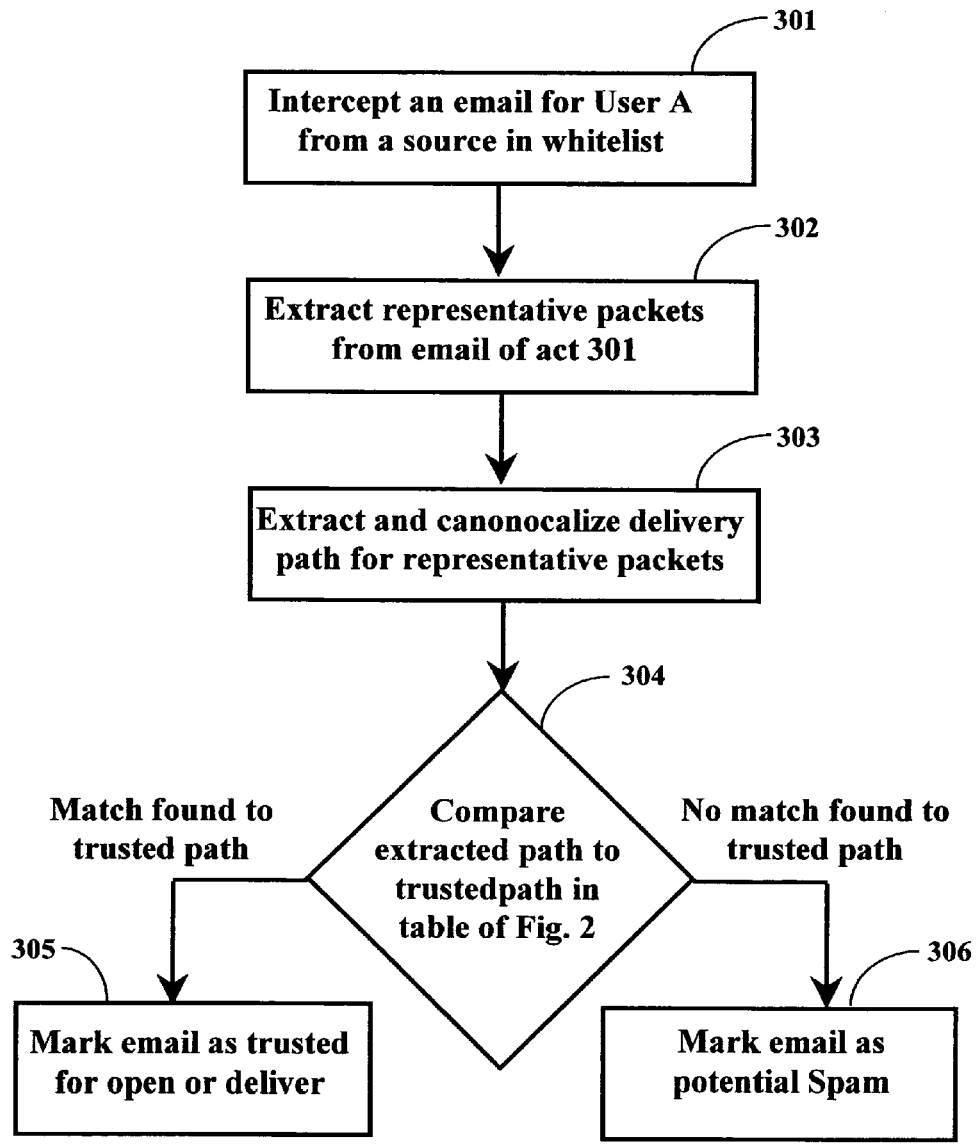
FIG. 3 is a flow diagram illustrating a method for practicing an embodiment of the present invention.

FIG. 3 is a flow diagram illustrating operation of logic 114 in an embodiment of the present invention for enhancing the process of checking a user's email for spam using a whitelist. In act 301, logic 114 intercepts an email intended for User A. The email may typically be stored in a portion of a repository prior to delivery to a user (downloading from an email server, usually initiated by the user). In this example the email is marked for delay until analyzed according to an embodiment of the invention.

At act 302, representative packets are extracted from the email intercepted in act 301. At act 303, delivery path data is extracted and canonocalized. At act 304 the canonocalized delivery path data extracted in act 303 is compared to trusted delivery path data 124 in a table such as the table of FIG. 2.

If, in the comparison in act 304, a match is found to a trusted path 124 for the particular purported source, then at act 305 the email may be marked as trusted to be opened, in the case of logic 114 executing on a user's PC, or for delivery, in the case of logic 114 operating at a group level for an organization such as enterprise 102 of FIG. 1, or at a network level, such as server 112 or server 111 of FIG. 1.

If, in the comparison in act 304, no match is found for a trusted path 124 from the purported source to the server, then the email may be marked as potential spam at act 306. After act 306 a number of alternative logic paths may be followed. For example, further determination might be made that nodes 122 in the delivery path are entirely foreign to nodes 122 in a trusted path 124 for the purported source and destination. That is, it may be determined that an email with a From: address for user A's spouse in another company in the same city in which User a operates, has nodes 122 for a foreign country, in which case the email might be marked as certain to be spam. In cases where there is no sure match, but there are definite similarities, the email may be marked as potential spam, and perhaps tested in other ways to make a determination.

According to various embodiments of the invention typical delivery paths are determined from certain domains and addresses to certain recipients, this information is recorded for use, and actual delivery path information is then used to compare with the trusted delivery path information developed. When a potential forgery is detected, it may be used as a primary feature in spam classification, and the influence of a user's white list can be accordingly discounted.

It will be apparent to the skilled artisan that there are many alterations that might be made in embodiments of the invention described above without departing from the spirit and scope of the present invention. There are, for example, many ways that different software developers might develop logic to accomplish the features described in embodiments of the invention. There are likewise many ways that delivery path information might be extracted and stored, and different ways that comparisons may be made, as well as different ways emails may be treated after a comparison is made. For these and other reasons the invention should be accorded the scope of the claims that follow.

What is claimed is:

1. A method for determining email spam, comprising:
    determining that an email addressed to a user is from a sender on a whitelist of senders associated with the user;
    upon determining that the email is from a sender on the whitelist of senders, obtaining a delivery path of the email including a plurality of delivery path nodes;
    matching the plurality of delivery path nodes of the email with a plurality of delivery path nodes of a trusted delivery path for the sender;
    upon determining that the plurality of delivery path nodes of the email match the plurality of delivery path nodes of the trusted delivery path for the sender, marking the email as a trusted message; and
    upon determining that less than all of the delivery path nodes of the email match delivery path nodes of the trusted delivery path for the sender, performing further spam checks comprising determining that the delivery path of the email includes any nodes for a foreign country, and upon determining that the delivery path of the email includes any nodes for a foreign country marking the email as spam.

2. A method of claim 1, wherein the email is marked as a trusted message only when all of the delivery path nodes of the email match delivery path nodes of the trusted delivery path for the sender.

3. The method of claim 1, further comprising marking the trusted message as a message to be opened.

4. The method of claim 1, further comprising sending the trusted message to the user.

5. The method of claim 1, wherein the method is performed at a server.

6. The method of claim 1, wherein the method is performed at a workstation associated with the user.

7. A non-transitory computer readable storage medium storing one or more programs configured for execution by a computer, the one or more programs comprising instructions for:
    determining that an email addressed to a user is from a sender on a whitelist of senders associated with the user;
    upon determining that the email is from a sender on the whitelist of senders, obtaining a delivery path of the email including a plurality of delivery path nodes;
    matching the plurality of delivery path nodes of the email with a plurality of delivery path nodes of a trusted delivery path for the sender;
    upon determining that the plurality of delivery path nodes of the email match the plurality of delivery path nodes of the trusted delivery path for the sender, marking the email as a trusted message; and
    upon determining that less than all of the delivery path nodes of the email match delivery path nodes of the trusted delivery path for the sender, performing further spam checks comprising determining that the delivery path of the email includes any nodes for a foreign country, and upon determining that the delivery path of the email includes any nodes for a foreign country marking the email as spam.

8. The non-transitory computer readable storage medium of claim 7, wherein the email is marked as a trusted message only when all of the delivery path nodes of the email match delivery path nodes of the trusted delivery path for the sender.

9. The non-transitory computer readable storage medium of claim 7, further comprising instructions for:
    marking the trusted message as a message to be opened.

10. The non-transitory computer readable storage medium of claim 7, further comprising instructions for:
    sending the trusted message to the user.

11. A system, for determining email spam, comprising:
    one or more central processing units for executing programs;
    memory storing one or more programs be executed by the one or more central processing units;
    the one or more programs comprising instructions for:
        determining that an email addressed to a user is from a sender on a whitelist of senders associated with the user;

upon determining that the email is from a sender on the whitelist of senders, obtaining a delivery path of the email including a plurality of delivery path nodes;

matching the plurality of delivery path nodes of the email with a plurality of delivery path nodes of a trusted delivery path for the sender;

upon determining that the plurality of delivery path nodes of the email match the plurality of delivery path nodes of the trusted delivery path for the sender, marking the email as a trusted message; and upon determining that less than all of the delivery path nodes of the email match delivery path nodes of the trusted delivery path for the sender, performing further spam checks comprising determining that the delivery path of the email includes any nodes for a foreign country, and upon determining that the delivery path of the email includes any nodes for a foreign country marking the email as spam.

12. The system of claim 11, wherein the email is marked as a trusted message only when all of the delivery path nodes of the email match delivery path nodes of the trusted delivery path for the sender.

13. The system of claim 11, further comprising instructions for:
marking the trusted message as a message to be opened.

14. The system of claim 11, further comprising instructions for:
sending the trusted message to the user.

15. The system of claim 11, wherein the system is a server system.

16. The system of claim 11, wherein the system includes a workstation associated with the user.

* * * * *